United States Patent [19]
Hunter et al.

[11] 3,896,619
[45] July 29, 1975

[54] EARTH SPIN AXIS DETECTING PLATFORM USING CORIOLIS ACCELERATION DETECTORS

[75] Inventors: Joe S. Hunter; Little J. Little, both of Huntsville; Escar L. Bailey, Athens, all of Ala.

[73] Assignee: The United States of America as represented by the Secretary of the Army, Washington, D.C.

[22] Filed: Apr. 30, 1974

[21] Appl. No.: 465,641

Related U.S. Application Data

[63] Continuation-in-part of Ser. No. 252,789, May 5, 1972, abandoned, which is a continuation-in-part of Ser. No. 94,706, Dec. 3, 1970, abandoned.

[52] U.S. Cl. .................................................. 33/300
[51] Int. Cl.² ........................................ G01C 21/10
[58] Field of Search ............................. 33/321, 300

[56] References Cited
OTHER PUBLICATIONS
G. P. Katys, *Continuous Measurement of Unsteady Flow*, Macmillan Co., N.Y. 1964, Ps. 26–32 pertinent.

*Primary Examiner*—William D. Martin, Jr.
*Attorney, Agent, or Firm*—Robert P. Gibson; Nathan Edelberg

[57] ABSTRACT

A self-alignment system for accurately aligning an earth bound, earth spin axis detecting platform for determining a north reference direction. The system uses two mass flow meter detectors in which a liquid is pumped therethrough in a closed system for sensing Coriolis acceleration. The two detectors are positioned on a platform with their supply tubes mutually perpendicular so that when Coriolis acceleration is sensed in either or both of the detectors, outputs from the detectors are used to torque the platform perpendicular to the earth's spin axis. When the platform is aligned perpendicular to the earth's spin axis, there is no longer any Coriolis acceleration on the detectors and the north reference direction is established since a vector normal to this platform is parallel to the earth's spin axis.

5 Claims, 7 Drawing Figures

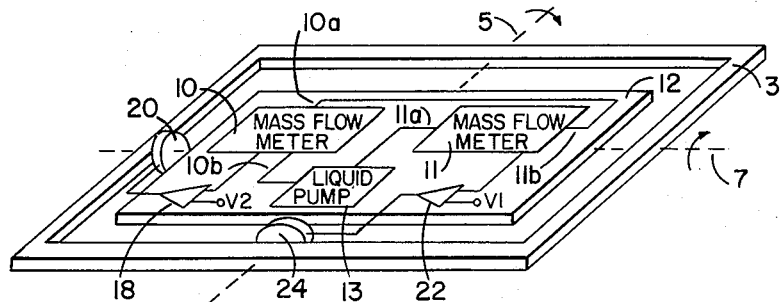
FIG. 1a
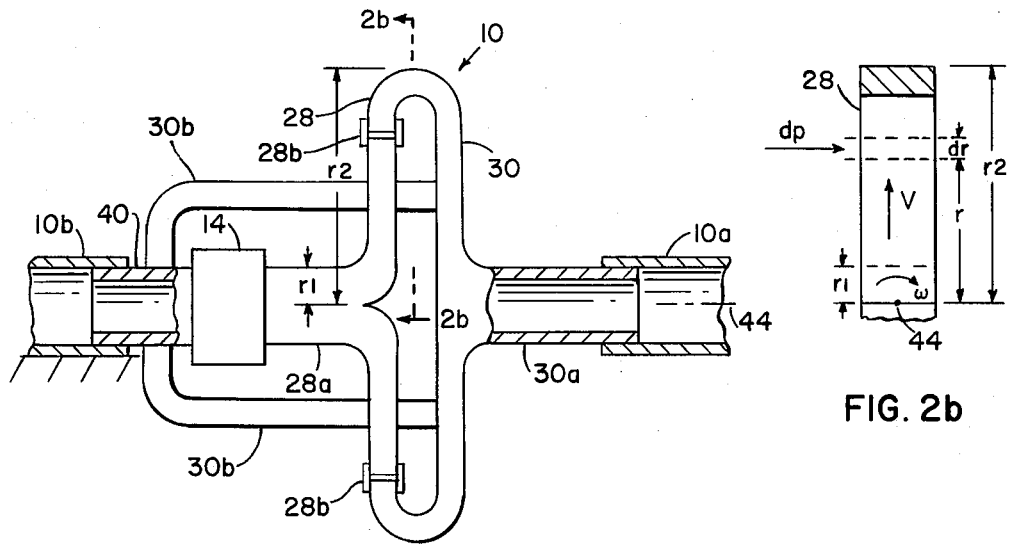
FIG. 2a
FIG. 2b
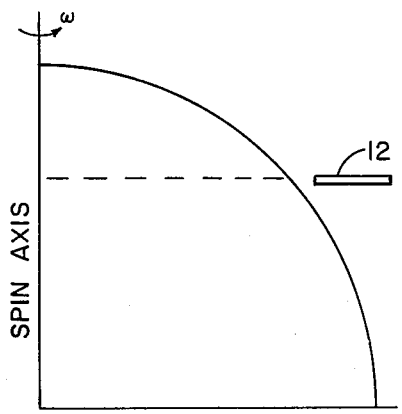
FIG. 1b
Joe S. Hunter
Little J. Little
Escar L. Bailey,
INVENTORS.

Joe S. Hunter
Little J. Little
Escar L. Bailey,
INVENTORS.

EARTH SPIN AXIS DETECTING PLATFORM USING CORIOLIS ACCELERATION DETECTORS

CROSS-REFERENCE TO RELATED APPLICATION

This is a Continuation-In-Part of our earlier application Ser. No. 252,789 filed May 5, 1972, which was in turn a Continuation-In-Part of our still earlier application Ser. No. 94,706, filed Dec. 3, 1970, now both abandoned.

BACKGROUND OF THE INVENTION

This invention is in the field of aligning earth bound platforms for determining a north reference direction to furnish a reference from which guided missiles are launched. Prior to the advent of the north-seeking platform, azimuth alignment utilized a ground mounted reference system having a north-seeking gyro and automatic devices to transfer the azimuth information to the platform for alignment thereof. Alternatives to the ground mounted reference system were a three gyro platform, or a fourth special purpose gyro. The three gyro self-alignment scheme had a horizontal gyro that defined the earth's east-west plane. The four gyro scheme used a north-seeking gyro to which azimuth alignment of the platform was slaved, along with three stabilization gyros. Both schemes were expensive since they required high performance gyros having drift rates on the order of 0.001° per hour or less. The instant invention is able to use liquid mass flow meter detectors for detecting Coriolis acceleration and electrical outputs therefrom for accurately aligning an earth spin axis detecting platform for determining a north reference direction.

SUMMARY OF THE INVENTION

The present invention is a system that uses liquid mass flow meter detectors for sensing Coriolis acceleration and aligning an earth bound, earth spin axis detecting platform. The platform alignment is used for determining a north reference direction. The liquid is pumped at a large mass flow rate through two mass flow meter detectors that have their supply tubes (sensitive axes) mutually perpendicular on the platform for sensing the presence of Coriolis acceleration in mutually perpendicular directions. Each detector develops an electrical output signal therefrom when Coriolis acceleration is detected. The electrical output signals are used for torquing the platform perpendicular to the earth's spin axis, a position where the Coriolis acceleration is no longer present on the detectors and the electrical output signals are nulled. With the output of the detectors nulled in this manner, any vector that is normal to the platform points in a north reference direction. After the platform is aligned in this manner, alignment control is then transferred to a triad of stabilization gyros.

BRIEF DESCRIPTION OF THE DRAWINGS

FIG. 1(a) is a schematic perspective view showing the arrangement of two mass flow meter detectors on a platform and in a closed circulatory system with their sensitive (spin) axes mutually perpendicular according to the invention;

FIG. 1(b) illustrates the position of the platform when the detectors are nulled;

FIGS. 2(a) and 2(b) are sectional views of a typical mass flow meter detector used in the present invention;

DESCRIPTION OF THE PREFERRED EMBODIMENT

Figure 3:
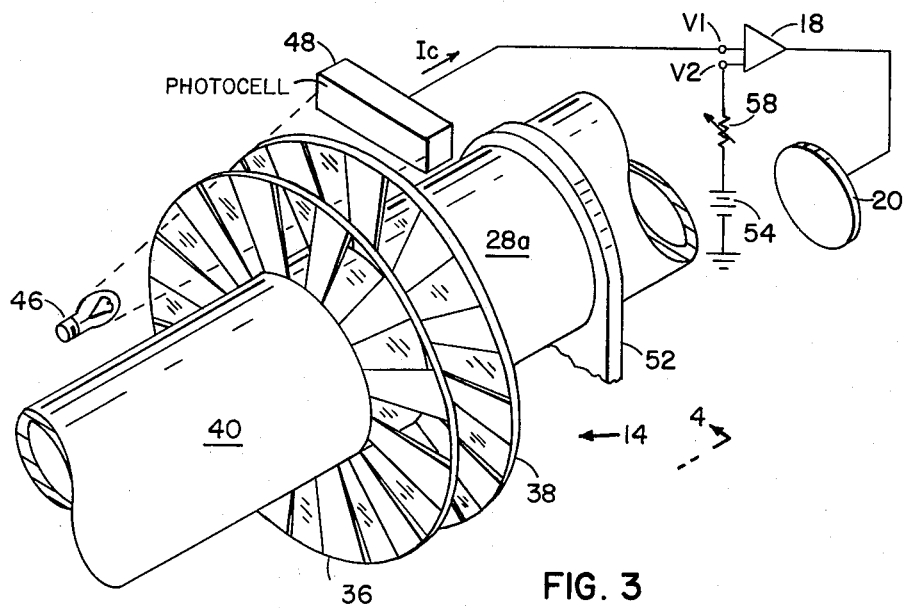
FIG. 3 is a schematic perspective view of a photocell torque measuring transducer and torquing circuit used with the mass flow meter detector shown in FIG. 2(a)

FIG. 1(a) is an exemplary embodiment of an earthbound, earth spin-axis detecting platform 12 using two Coriolis acceleration detectors 10 and 11 thereon. Detectors 10 and 11 are mass flow meters. The platform has two degrees of freedom about frame 3. Frame 3 must be earthbound, since Coriolis acceleration can only be sensed on land. One degree of freedom of platform 12 is about axis 5, and a second degree of freedom is about axis 7. The two Coriolis acceleration mass flow meter detectors 10 and 11 have their sensitive (spin) axes mutually perpendicular to each other and parallel with axes 5 and 7, respectively. A dense liquid, such as mercury, is circulated by pump 13 through a closed circuit that includes detectors 10 and 11. Coriolis acceleration is present on the liquid flowing through each of these detectors. For a better understanding of the operation of the Coriolis acceleration detectors, the platform is shown in FIG. 1(b) with relation to a cutaway view of a quarter of the earth when the Coriolis acceleration on both detectors is nulled. That is, the detectors sense Coriolis acceleration along the two axes 5 and 7 until platform 12 is torqued perpendicular to the earth's spin axis, a position where Coriolis acceleration in both detectors are nulled. Electrical output signals are produced from a transducer within each of detectors 10 and 11, and these signals are applied as a first input to differential amplifiers 18 and 22 respectively even when there is no Coriolis acceleration present thereon. A balancing voltage V2 is applied to a second input to each of differential amplifiers 18 and 22 and is set to null the output of the differential amplifiers when there is no Coriolis acceleration on detectors 10 and 11. After the output of the differential amplifiers are nulled, any Coriolis acceleration present on the detectors causes an electrical imbalance to exist between the first and second inputs of the differential amplifiers. This imbalance causes electrical outputs from amplifiers 18 and 22, which electrical outputs being applied to gimbal torques 20 and 24, respectively, for torquing platforms 12 about axes 7 and 5.

Figure 4:
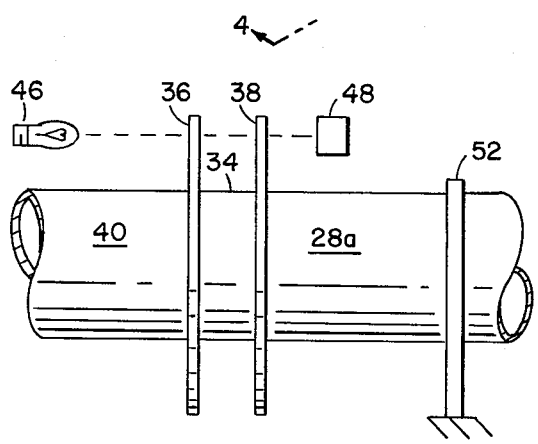
FIG. 4 is an orthographic view of FIG. 3 taken in direction 4—4 showing the tensiometric element of the transducer in more detail.

Refer now to FIGS. 2(a) and 2(b) for an explanation of detector 10 while keeping in mind that detector 11 has identical elements and performs the same function. Detector 10 mass flow meter includes two generally T-shaped tubes 28 and 30 joined to each other at flexible joints 28b. These joints may take the form of steel or polyvinyl bellows, both well known in the art. Transducer 14, shown in block diagram form as part of FIG. 2(b) and explained in more detail in reference to FIGS. 3 and 4, is attached between stem 28a of T-shaped tube 28 and input tube 40. Tube 30 is rigidly attached to tube 40 by arms 30b. The liquid is pumped through detector 10, entering at input tube 40 and exiting through stem 30a of tube 30. Tubes 40 and stem 30a have common center line about sensitive (spin) axis 44. A Coriolis acceleration is imparted to the liquid flowing through the joined legs of T-shaped tubes 28 and 30 on platform 12 if the platform is not perpendicular to the earth's spin axis. This acceleration is in one direction for the liquid flowing outward from axis 44 through tube 28 and in the opposite direction for liquid flowing toward axis 44 through tube 30. A relative movement thus occurs between tubes 28 and 30 by virtue of flexible joints 28b. Detector 10 is space fixed and appears to rotate at a constant rate, $\omega$, which is the earth's spin rate. Detector 10 is supported by tubing 10a and 10b, and detector 11 is supported in the same manner by tubing 11a and 11b. Tubing 10a and 10b are secured to platform 12 and tubing 10b is, in turn, rigidly secured to input tube 40. Stem 30a is free to rotate within tubing 10a. As the liquid passes through detector 10, a moment, M, is developed whose magnitude is the product of the mass flow rate of the liquid through tubes 28 and 30 and the length of the moment arm measured outward from spin axis 44 to the outermost part of tube 28. FIG. 2(b) shows some of the symbols used in the equations below. Elements 28b and 30b are omitted in FIG. 2(b). The distance from r1 to r2 along tube 28 is the effective moment arm measuring length. The distance r1 is the radius of section 28a of tube 28. The distance r2 is measured from spin axis 44 to the outermost part of tube 28. The Coriolis acceleration force exerted on tubes 28 and 30 by a liquid flowing through the detector can be expressed by the equation, $$dp = (\rho A dr)\alpha \quad (1)$$

where
$\rho$ = the density of the liquid
$A$ = the cross-sectional area of the tube
$r$ = the radial distance of the liquid element in tubes 28 and 30 from the axis of rotation
$\alpha$ = the Coriolis acceleration, which has the same value for any part of the liquid present in tube 28 ($\alpha = 2\omega V$) and
$v$ = the linear flow rate of the liquid in the tube.

The magnitude of the mass flow rate through the tube is $Q = \rho A v$. Upon substitution, $$dp = 2\omega Q \omega dr. \quad (2)$$

In equation (2), $dp$ is the differential pressure along tubes 28 and 30 and $dr$ is the differential distance along the tubes 28 and 30.

The moment, about spin axis 44, which is developed in tubes 28 and 30 under the influence of Coriolis acceleration is $$M = \int_{r1}^{r2} 2Q\omega r\, dr = \omega(r2^2 - r1^2)Q. \quad (3)$$

Thus, the moment is proportional to the mass flow rate of the liquid and the length of the moment arm. It follows that the magnitude of the measured moment is unaffected by the properties of the liquid. The sole requirement for this moment is that it develops radial motion of the liquid in the rotating tube. For a tube 40 having an inside diameter of 5 inches, with a flow rate of 20 ft./sec. of mercury (density 850 lbs./cubic ft.), and an (r2 − r1) distance of 1.5 ft., a moment of 0.564 in. oz. would be obtained $$Q = \frac{850 \text{ lbs.}}{\text{ft.}^3} \times \frac{\pi (5 \text{ in.})^2}{4(12 \text{ in.})^2} \times \frac{20 \text{ ft.}}{\text{sec.}} = 2317 \frac{\text{lbs.}}{\text{sec.}}$$

The moment $M = 1.167 \times 2\pi \times 10^{-5} \frac{\text{rev.}}{\text{sec.}} (1.916^2 - 0.416^2) \text{ ft.}^2 \frac{2317 \text{ lbs.}}{\frac{\text{sec.}}{32.2 \text{ ft.}}}$ $= 3.54$ in. ozs.

The mass flow rate of 2,317 lbs./sec. is divided in this equation by 32.2 ft./sec.$^2$ to give a flow rate of 72 slugs/sec..

Refer now to FIG. 3 for an explanation of torque measuring transducer 14, which is used in measuring the Coriolis acceleration vector applied to mass flow meter detector 10. This torque measuring transducer uses light source 46 and photocell 48 with discs 36 and 38 positioned therebetween for detecting the amount of Coriolis acceleration on mass flow meter detector 10. Transducer 14 has a tensiometric tube section 34, made of some flexible material such as rubber, positioned between dics 36 and 38. Section 34 is attached to discs 36 and 38 and allows twisting movement between the discs. Disc 36 is attached to tube 40, and disc 38 is attached to section 28a. Discs 36 and 38 have equally spaced alternate transparent and opaque sectors thereon. These discs are initially positioned on tubes 28a and 40 such that the transparent and opaque sectors overlap with 50 percent of the light from light source 46 impinging upon photocell 48. Therefore, a quiescent output current, Ic, will be generated from photocell 48 even when there is no Coriolis acceleration applied to detector 10. This quiescent output current is applied as voltage V1 to a first input of differential amplifier 18. For proper operation of the platform, a zero output from amplifier 18 is required when the Coriolis acceleration on detector 10 is nulled. Since 50 percent of the transparent sectors of discs 36 and 38 pass light from light source 46 to photocell 48 when the Coriolis acceleration is nulled, voltage V1 must be equalized by a second voltage V2 applied at a second input to differential amplifier 18. This equalization is accomplished by applying a voltage source 54 to a second input of amplifier 18 through variable resistor 58. This equalization is established before any liquid is circulated through detector 10. The power to light 46 is furst turned on and battery 54 is connected through resistor 58 to the second input to amplifier 18. A voltmeter is connected across the output to 18 and resistor 58 is varied until the output of 18 is zero, thus indicating that V1 equals V2. The detector is then ready for the liquid to be circulated therethrough. When voltages V1 and V2 are equal with no Coriolis acceleration present on detector 10, any subsequent realignment of platform 12 will cause an output from transducer 14 to be generated and applied to the input to amplifier 18. In turn, an electrical output signal will be generated at the output of amplifier 18 and directed to the input of gimbal torquer 20. Gimbal torquer 20 torques platform 12 until the Coriolis acceleration on detector 10 is again nulled. An example of a transducer usable with the above-given dimensions and flow rate would be similar to the model TQ-3 Torque Measuring Transducer produced by Vibrac Corporation of Chelmsford, Massachusetts except air bearings would be necessary in place of the ball bearings of this model, to give a resolution of 0.0003 in. oz. instead of the current resolution of 0.03 in. oz. With M = 3.54 in. oz., an accuracy of $$\sin^{-1} \frac{0.0003}{3.54} = 0.49 \text{ degrees}$$

could be realized.

In FIG. 4, the tensiometric element of transducer 14 is shown enlarged and in more detail. Some support means 52, such as a bearing, supports section 28a of T-shaped tube 28 on platform 12 and allows rotary motion of section 28a therein.

Twisting motion can be imparted to tensiometric element 34 through rotatable section 28a and disc 38 acting against stationary disc 36 and tube 40.

Figure 5:
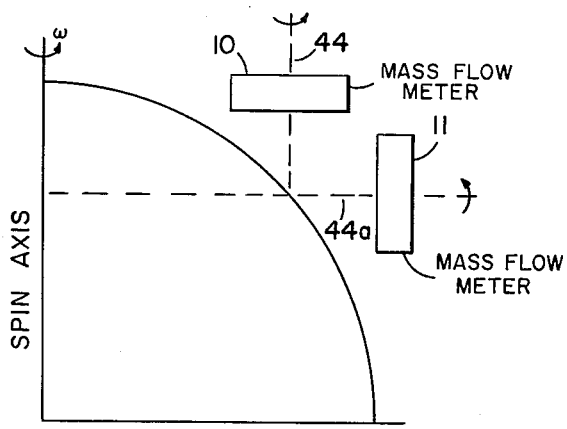
FIG. 5 illustrates the position of two mass flow meters and their spin axes relative to the earth for maximum and for zero Coriolis acceleration thereon.

In FIG. 5, the two Coriolis acceleration detectors 10 and 11 are shown with their input tubes, or spin axes, perpendicular to each other in the earth's rotation field. For example, if mass flow meter detector 10 is mounted with its spin axis parallel to the earth's spin axis as shown, the spin rate of T-shaped tubes 28 and 30 will be the same as of T-shaped spin rate of the earth, i.e. 15.04° per hour. The Coriolis acceleration on detector 10 is at a maximum in this position because of a differential moment from one side to the other side of tubes 28 and 30 caused by Coriolis acceleration on the liquid flowing through the tubes. Also, if the other Coriolis acceleration mass flow meter detector 11 is mounted with its spin axis 44a perpendicular to the earth's spin axis, then there is no differential moment from one side of the T-shaped tubes 28 and 30 to the other, since the Coriolis acceleration about axis 44a is zero ($\omega = 0$).

In this invention, a large mass flow is desirable because the earth's spin rate is relatively small. Thus, the use of a dense liquid, such as mercury, is desirable. When the twisting moment on each tensiometric element of detectors 10 and 11 is nulled, both spin axes 44 and 44a are perpendicular to the earth's spin axis. Platform 12 is, therefore, parallel to the equatorial plane and any vector normal to the platform points in a north reference direction.

The earth bound, earth spin axis detecting platform presented above has several advantages over conventional north seeking platforms. It offers a more economical method of determining a north reference direction by replacing required high performance gyros with relatively inexpensive Coriolis acceleration mass flow meter detectors.

We claim:

1. An earth spin axis detecting system using a Coriolis acceleration detector system employing two mass flow meter detectors mounted on an earth bound platform, each of said detectors having an input tube and an output tube positioned along a common sensitive axis, with the sensitive axes of each of said detectors being orthogonal; means for causing liquid flow through said mass flow meter detectors in which Coriolis acceleration forces are applied to said liquid circulating in said detectors; a Coriolis acceleration detecting means within each of said two mass flow meter detectors, said detecting means having a signal producing means with an output therefrom whereby an electrical output signal is produced having a magnitude and polarity according to said Coriolis acceleration on each of said detectors; and torquing means having an input electrically connected to said electrical output signal for driving said platform perpendicular to the earth's spin axis and nulling said Coriolis acceleration on said mass flow meter detectors wherein a vector normal to said platform points in a desired north reference direction.

2. A system as set forth in claim 1 wherein said means for causing liquid flow is a liquid pump and a closed circulatory system wherein said closed circulatory system includes said two mass flow meter detectors.

3. A system as set forth in claim 2 wherein each of said two mass flow meter detectors comprises two generally T-shaped tubes with the legs of the T of one tube flexibly connected to the legs of the T of the other tube to provide two paths for said liquid to flow therethrough and the stem of the T of said one tube connected to said signal producing means and being said input tube and the stem of the T of said other tube being said output tube.

4. A system as set forth in claim 3 wherein said signal producing means comprises a light source and a photocell having an output therefrom, a first and a second disc positioned between said light source and said photocell and having equally spaced opaque and transparent sectors thereon, said first disc being attached to said input tube and said second disc being attached to a main stem section of one of two T-shaped tubes within said mass flow meter detector, a tensiometric tube attached at one end to said first disc and attached at a second end to said second disc for providing a twisting movement on said discs relative to each other when a Coriolis acceleration force is applied to said T-shaped tubes whereby the twisting movement causes a variable amount of light from said light source to impinge on said photocell, with the amount of light impinging on said photocell regulating said electrical output signal to said torquing means.

5. A system as set forth in claim 4 wherein said torquing means comprises a differential amplifier having a first input connected to said electrical output signal and a second input connected to a balancing voltage and an output connected as an input of a gimbal torquer wherein said torquer torques said platform perpendicular to the earth's spin axis when said electrical output signal applied to said first input varies.

* * * * *